(12) United States Patent
Cagno et al.

(10) Patent No.: US 8,700,219 B2
(45) Date of Patent: Apr. 15, 2014

(54) PERIODIC ROTATIONAL VIBRATION CHECK FOR STORAGE DEVICES TO COMPENSATE FOR VARYING LOADS

(75) Inventors: Brian James Cagno, Tucson, AZ (US); Kenton Coleman Green, Cary, NC (US); Carl Evan Jones, Tucson, AZ (US); Michael Desmond O'Connell, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/566,823

(22) Filed: Aug. 3, 2012

(65) Prior Publication Data

US 2013/0033784 A1 Feb. 7, 2013

Related U.S. Application Data

(62) Division of application No. 11/467,417, filed on Aug. 25, 2006, now Pat. No. 8,271,140.

(51) Int. Cl.
*G05B 15/00* (2006.01)
*G05D 19/02* (2006.01)

(52) U.S. Cl.
USPC ............................................ 700/280; 714/6.2

(58) Field of Classification Search
USPC .................... 700/28, 280; 702/56; 714/6.2
See application file for complete search history.

(56) References Cited

U.S. PATENT DOCUMENTS

| | | | |
|---|---|---|---|
| 4,477,755 A | 10/1984 | Rickert | |
| 5,893,048 A | 4/1999 | Pate et al. | |
| 6,415,189 B1 | 7/2002 | Hajji | |
| 6,489,884 B1 | 12/2002 | Lamberson et al. | |
| 6,665,633 B2 | 12/2003 | Fioravanti et al. | |
| 6,937,417 B2 | 8/2005 | Nagaki et al. | |
| 6,958,879 B2 | 10/2005 | Oh et al. | |
| 6,978,259 B1* | 12/2005 | Anderson et al. | 706/19 |
| 7,221,532 B1 | 5/2007 | Shukla | |
| 7,321,477 B2 | 1/2008 | Suzuki et al. | |
| 7,434,090 B2* | 10/2008 | Hartung et al. | 714/6.2 |
| 8,271,140 B2 | 9/2012 | Cagno et al. | |
| 2003/0212872 A1* | 11/2003 | Patterson et al. | 711/165 |

(Continued)

FOREIGN PATENT DOCUMENTS

| JP | 2005-50448 | * | 2/2005 |
|---|---|---|---|
| JP | 200550448 | | 2/2005 |

(Continued)

OTHER PUBLICATIONS

English Abstract of KR20010017826 filed Mar. 5, 2001.

(Continued)

*Primary Examiner* — Sean P. Shechtman
*Assistant Examiner* — Steven Garland
(74) *Attorney, Agent, or Firm* — William K. Konrad; Konrad, Raynes, Davda and Victor LLP

(57) ABSTRACT

A periodic rotational vibration check for storage devices to compensate for varying loads is disclosed. A variable representing rotational vibration status is maintained in a rotational vibration log. The variable is processed to determine whether a storage device exhibits a rotational vibration issue. Workload analysis is performed to identify a change to the workloads run on physically separate hardware to resolve the rotational vibration issue and thus eliminate the need for more expensive hardware.

23 Claims, 11 Drawing Sheets

(56) References Cited

U.S. PATENT DOCUMENTS

| | | |
|---|---|---|
| 2004/0027799 A1 | 2/2004 | King et al. |
| 2004/0260967 A1 | 12/2004 | Guha et al. |
| 2005/0005206 A1 | 1/2005 | Popescu |
| 2006/0100797 A1 | 5/2006 | Poorman et al. |
| 2006/0212755 A1 | 9/2006 | Urmanov et al. |
| 2006/0282709 A1 | 12/2006 | Shu et al. |
| 2008/0071393 A1 | 3/2008 | Cagno et al. |

FOREIGN PATENT DOCUMENTS

| | | |
|---|---|---|
| KR | 20010017826 | 8/1999 |
| KR | 20010065600 | 7/2001 |
| KR | 20030035806 | 5/2003 |

OTHER PUBLICATIONS

List of References in Korean OA.

English translation of JP200550448 filed Feb. 24, 2005.

First Office Action dated Aug. 5, 2008, pp. 1-12 for U.S. Appl. No. 11/467,417, filed Aug. 25, 2008 by inventors B.J. Cagno, et al.

Response dated Nov. 5, 2008, pp. 1-11, to First Office Action dated Aug. 5, 2008, pp. 1-12 for U.S. Appl. No. 11/467,417, filed Aug. 25, 2006 by inventors B.J. Cagno, et al.

Second Office Action dated Jan. 29, 2009, pp. 1-9 for U.S. Appl. No. 11/467,417, filed Aug. 25, 2006 by inventors B.J. Cagno, et al.

Response dated Apr. 29, 2009, pp. 1-14 to Second Office Action dated Jan. 29, 2009, pp. 1-9 for U.S. Appl. No. 11/467,417, filed Aug. 25, 2006 by inventors B.J. Cagno, et al.

Third Office Action dated Jul. 27, 2009, pp. 1-16 for U.S. Appl. No. 11/467,417, filed Aug. 25, 2006 by inventors B.J. Cagno, et al.

Response dated Nov. 25, 2009, pp. 1-16 to Third Office Action dated Jul. 27, 2009, pp. 1-16 for U.S. Appl. No. 11/467,417, filed Aug. 25, 2008 by inventors B.J. Cagno, et al.

Final Office Action dated Mar. 18, 2010, pp. 1-11 for U.S. Appl. No. 11/467,417, filed Aug. 25, 2006 by inventors B.J. Cagno, et al.

Response dated May 18, 2010, pp. 16 to Final Office Action dated Mar. 18, 2010, pp. 1-11 for U.S. Appl. No. 11/467,417, filed Aug. 25, 2009 by inventors B.J. Cagno, et al.

Response dated Jun. 18, 2010, pp. 16 to Final Office Action dated Mar. 18, 2010, pp. 1-11 for U.S. Appl. No. 11/467,417, filed Aug. 25, 2006 by inventors B.J. Cagno, et al.

Fifth Office Action dated Jul. 1, 2011, pp. 1-17 for U.S. Appl. No. 11/467,417, filed Aug. 25, 2006 by inventors B.J. Cagno, et al.

Response dated Dec. 1, 2011, pp. 1-17 to Fifth Office Action dated Jul. 1, 2011, pp. 1-17 for U.S. Appl. No. 11/467,417, filed Aug. 25, 2006 by inventors B.J. Cagno, et al.

Sixth Office Action dated Jul. 15, 2012, pp. 1-19 for U.S. Appl. No. 11/467,417, filed Aug. 25, 2006 by inventors B.J. Cagno, et al.

Response dated Apr. 12, 2012, pp. 1-13 to Sixth Office Action dated Jul. 15, 2012, pp. 1-19 for U.S. Appl. No. 11/467,417, filed Aug. 25, 2006 by inventors B.J. Cagno, et al.

Notice of Allowance dated May 10, 2012, pp. 1-8 for U.S. Appl. No. 11/467,417, filed Aug. 25, 2006 by inventors B.J. Cagno, et al.

\* cited by examiner

PERIODIC ROTATIONAL VIBRATION CHECK FOR STORAGE DEVICES TO COMPENSATE FOR VARYING LOADS

RELATED APPLICATIONS

This application is a divisional application of parent application Ser. No. 11/467,417, filed Aug. 25, 2006 now U.S. Pat. No. 8,271,140, entitled PERIODIC ROTATIONAL VIBRATION CHECK FOR STORAGE DEVICES TO COMPENSATE FOR VARYING LOADS, assigned to the assignee of the present application and incorporated by reference in its entirety.

BACKGROUND OF THE INVENTION

1. Field of the Invention

This invention relates in general to rotational vibrations in a storage device, and more particularly to a periodic rotational vibration check for storage devices to compensate for varying loads.

2. Description of Related Art

When it comes to data storage, more is never enough. Each time an increase in storage capacity is provided, new applications and uses for the increased capacity are developed, which leaves consumers and businesses needing even more. The advent of digital pictures, music and movies led to a greater diversity and capacity of storage systems and services. For example, consumers wanting to store more music, photos and videos look to the storage industry to pack more and more storage capacity on smaller devices.

Businesses' demand for storage also shows no signs of abating. E-mail and other reference demand for storage continues to be insatiable, particularly with the increasing importance and volume of e-mail, content-rich media and other reference data. In addition, the financial industry faces stringent requirements for data protection and retention, further increasing data volumes. Meanwhile, growing global competition has accelerated the need for improved business productivity, which require more frequent and intelligent access to transaction data. Such transaction data often must be protected and retained much longer.

Accordingly, the areal density needed to achieve today's demanded capacity points for magnetic and optical storage devices, such as disk drives tape drives, optical drives, etc., requires that data blocks be written with increasing accuracy relative to a track's center. External force or rotational vibration (RV) can cause a drive's head to deviate from the track center. Storage devices generate emitted vibration, given their mechanical nature. There are two sources of a drive vibration. Idle vibration occurs while the disk drive is spinning Seek vibration occurs while the disk drive is seeking to a desired data position. Drives within a multi-disk enclosure are susceptible to the emitted vibrations of adjacent devices. Rotational Vibration (RV) is created when the vibration emitted from one or more disk drives operating in the enclosure induce vibration on adjacent drives. RV can cause increased seek times due to extended track settling time and results in an increased risk of an actuator traveling off track, thereby resulting in writes needing to be aborted or reads needing to be re-tried As storage device technology advances, rotational vibration as described above begins to play an even greater roll in performance. Drive vendors have realized this and newer drives designs utilized robust mechanical structures and damping materials to reduce vibrations and prevent RV problems. For example, previous designs have utilized accelerometers that the drive uses to compensate for rotational vibration so that performance is not degraded. However, this actually creates an issue in storage enclosure systems because problems in the system design can be masked. As storage array densities increase, rotational vibration is induced from adjacent storage devices in the system so that the rotational vibration increases and becomes more load dependant. Seeks on drives produce the most amount of rotational vibration. Since different customers can be running unique loads, it is possible that a vibration level is hit that can cause data loss.

It can be seen that there is a need for a periodic rotational vibration check for storage devices to compensate for varying loads.

SUMMARY OF THE INVENTION

To overcome the limitations in the prior art described above, and to overcome other limitations that will become apparent upon reading and understanding the present specification, the present invention discloses a periodic rotational vibration check for storage devices to compensate for varying loads.

The present invention solves the above-described problems by maintaining a variable representing rotational vibration status in a rotational vibration log. The variable is processed to determine whether a storage device exhibits a rotational vibration issue. Workload analysis is performed to identify a change to the workloads run on physically separate hardware to resolve the rotational vibration issue and thus eliminate the need for more expensive hardware.

A program product comprising a computer readable medium embodying at least one program of instructions executable by a computer to perform operations to monitor rotational vibrations is provided. The operations include monitoring rotational vibration in a storage system, analyzing system workloads and reconfiguring the storage system based upon the analysis of the system workloads to reduce the rotational vibration.

In another embodiment of the present invention, a system is provided. The system includes a processor and memory, coupled to the processor, the memory comprising a computer usable medium embodying at least one program of instructions to perform operations, the operations include monitoring rotational vibration of at least one storage device in a storage system, analyzing system workloads and reconfiguring the storage system based upon the analysis of the system workloads to reduce the rotational vibration.

In another embodiment of the present invention, a method for providing a periodic rotational vibration check for storage devices to compensate for varying loads is provided. The method includes accessing, by a service provider, a rotational vibration log associated with at least one storage device in a storage system and analyzing the rotational vibration log to resolve a rotational vibration problem indicated by the rotational vibration log.

In another embodiment of the present invention, a program product is provided. The program product includes a computer readable medium embodying at least one program of instructions executable by a computer to perform operations to monitor rotational vibrations, wherein the operations include maintaining rotational vibration data associated with at least one storage device of a storage system in a rotational vibration log and using the rotational vibration data to correct a rotational vibration issue.

In another embodiment of the present invention, a method for providing a periodic rotational vibration check for storage devices to compensate for varying loads is provided. The method includes maintaining rotational vibration data associated with at least one storage device of a storage system in a rotational vibration log and using the rotational vibration data to correct a rotational vibration issue.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides a periodic rotational vibration check for storage devices to compensate for varying loads. A variable representing rotational vibration status is maintained in a rotational vibration log. The variable is processed to determine whether a storage device exhibits a rotational vibration issue. Workload analysis is performed to identify a change to the workloads run on physically separate hardware to resolve the rotational vibration issue and thus eliminate the need for more expensive hardware.

Figure 1:
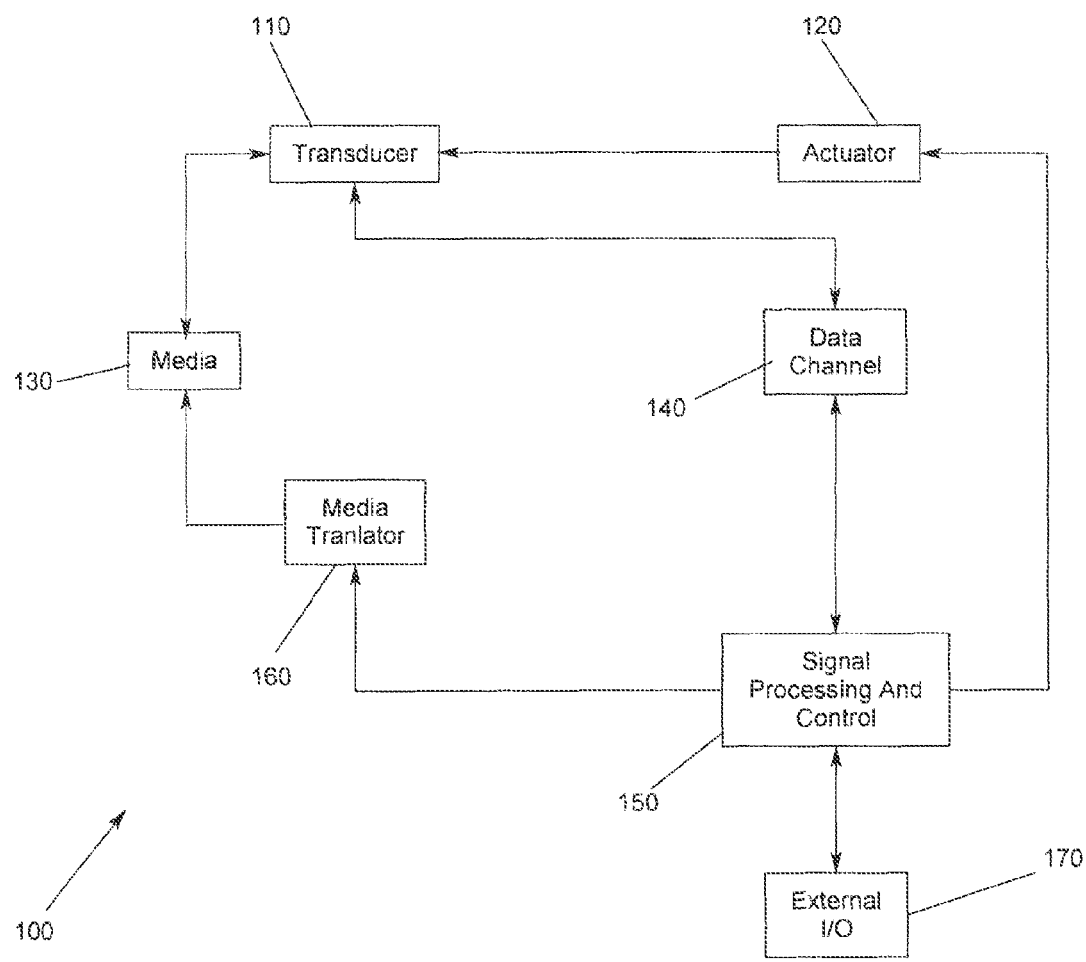
FIG. 1 illustrates a storage system according to an embodiment of the present invention.

FIG. 1 illustrates one example of a storage system 100 according to the present invention. A transducer 110 is under control of an actuator 120, whereby the actuator 120 controls the position of the transducer 110. The transducer 110 writes and reads data on magnetic media 130. The read/write signals are passed to a data channel 140. A signal processor 150 controls the actuator 120 and processes the signals of the data channel 140 for data exchange with external Input/Output (I/O) 170. I/O 170 may provide, for example, data and control conduits for a desktop computing application, which utilizes storage system 100. In addition, a media translator 160 is controlled by the signal processor 150 to cause the magnetic media 130 to move relative to the transducer 110. However, those skilled in the art will recognize that the present invention is not meant to be limited to a particular type of storage system 100 or to the type of media 130 used in the storage system 100. For example, tape drives and optical drives also generate emitted vibration due to their similar mechanical nature.

Figure 2:
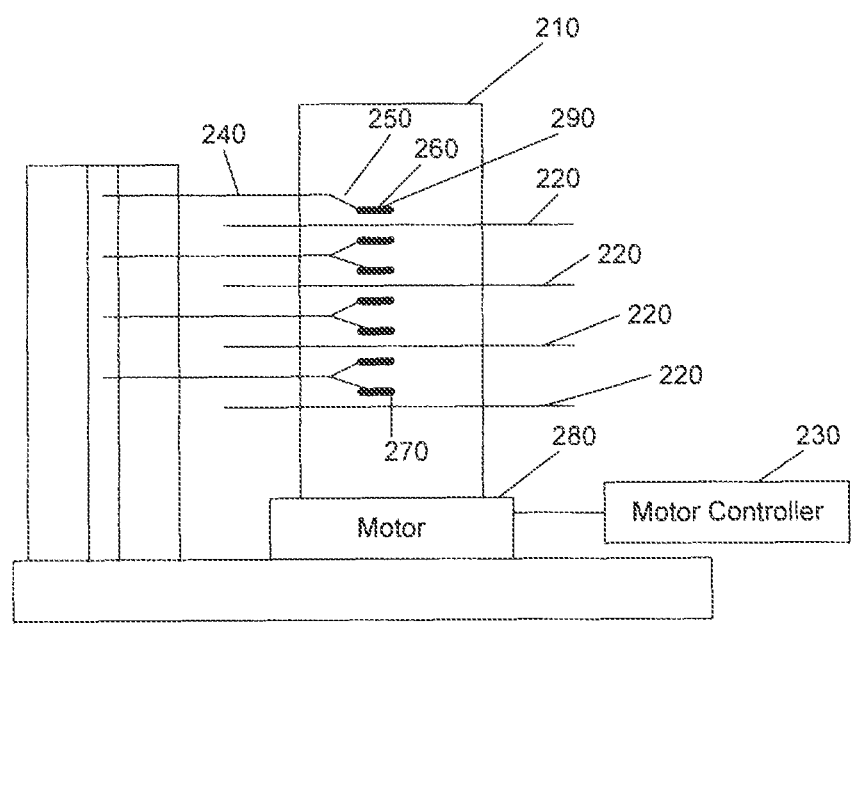
FIG. 2 illustrates one storage system according to an embodiment of the present invention.

FIG. 2 illustrates one particular embodiment of a multiple magnetic disk storage system 200 according to the present invention. In FIG. 2, a hard disk drive storage system 200 is shown. The system 200 includes a spindle 210 that supports and rotates multiple magnetic disks 220. The spindle 210 is rotated by motor 280 that is controlled by motor controller 230. A combined read and write magnetic head 270 is mounted on slider 260 that is supported by suspension 250 and actuator arm 240. Processing circuitry exchanges signals that represent information with read/write magnetic head 270, provides motor drive signals for rotating the magnetic disks 220, and provides control signals for moving the slider 260 to various tracks. Although a multiple magnetic disk storage system is illustrated, a single magnetic disk storage system is equally viable in accordance with the present invention.

The suspension 250 and actuator arm 240 position the slider 260 so that read/write magnetic head 270 is in a transducing relationship with a surface of magnetic disk 220. When the magnetic disk 220 is rotated by motor 280, the slider 260 is supported on a thin cushion of air (air bearing) between the surface of disk 220 and the ABS 290. Read/write magnetic head 270 may then be employed for writing information to multiple circular tracks on the surface of magnetic disk 220, as well as for reading information therefrom.

Figure 3:
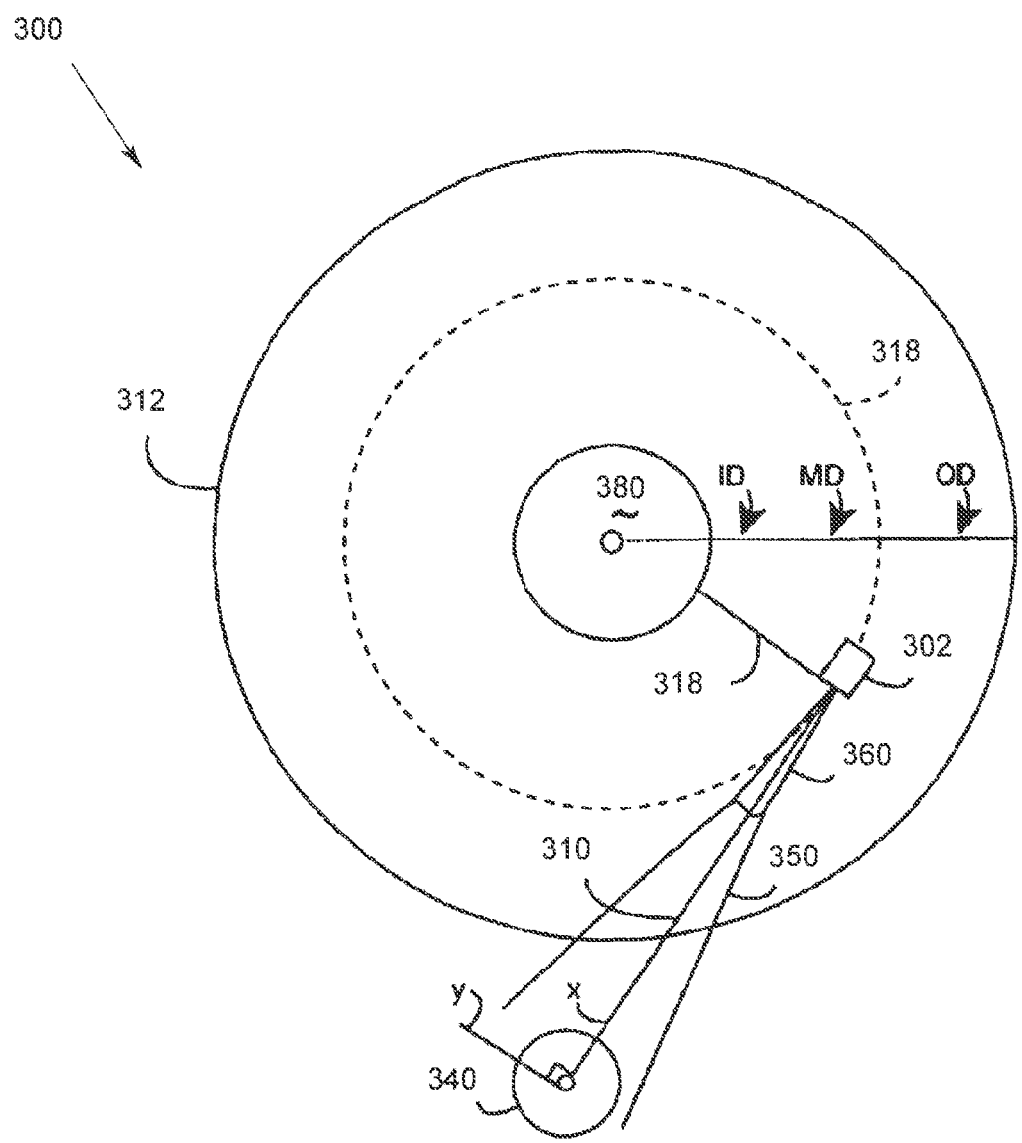
FIG. 3 shows an example of a center track of a storage device according to an embodiment of the present invention.

FIG. 3 shows an example of a center track of a storage device 300 according to an embodiment of the present invention. In FIG. 3, an actuator arm assembly pivots about the actuator axis 340, thereby changing the angle between the radial vector 318 and the actuator principal axis 310. The actuator arm assembly includes the actuator arm 350 coupled to head gimbal assembly 360, which is coupled to slider 302. Typically, the actuator arm assembly will rotate through various angles between a furthest inside position of the disk and the furthest outside position on the disk. The recording medium may be viewed as having three regions. These are designated ID (corresponding to the furthest inside position), MD (a middle position where radial vector 318 is approximately at a right angle with 310), and OD (the furthest outside position).

In FIG. 3, an X-axis extends along the principal axis 310 of the actuator arm, and a Y-axis intersects the X-axis at essentially actuator pivot 340. When the actuator arm 350 positions the slider 302 so that the read-write head is at MD, the radial vector 318 is nearly parallel to the Y-axis. Track 318 is shown near MD, but tracks exist from ID to OD, across the disk surface 312.

The hard disk drive may include a plurality of actuator arms and head sliders located adjacent to the disks all controlled by the same voice coil motor. The heads may have separate write and read elements that magnetize and sense the magnetic field of the disks.

Figure 4:
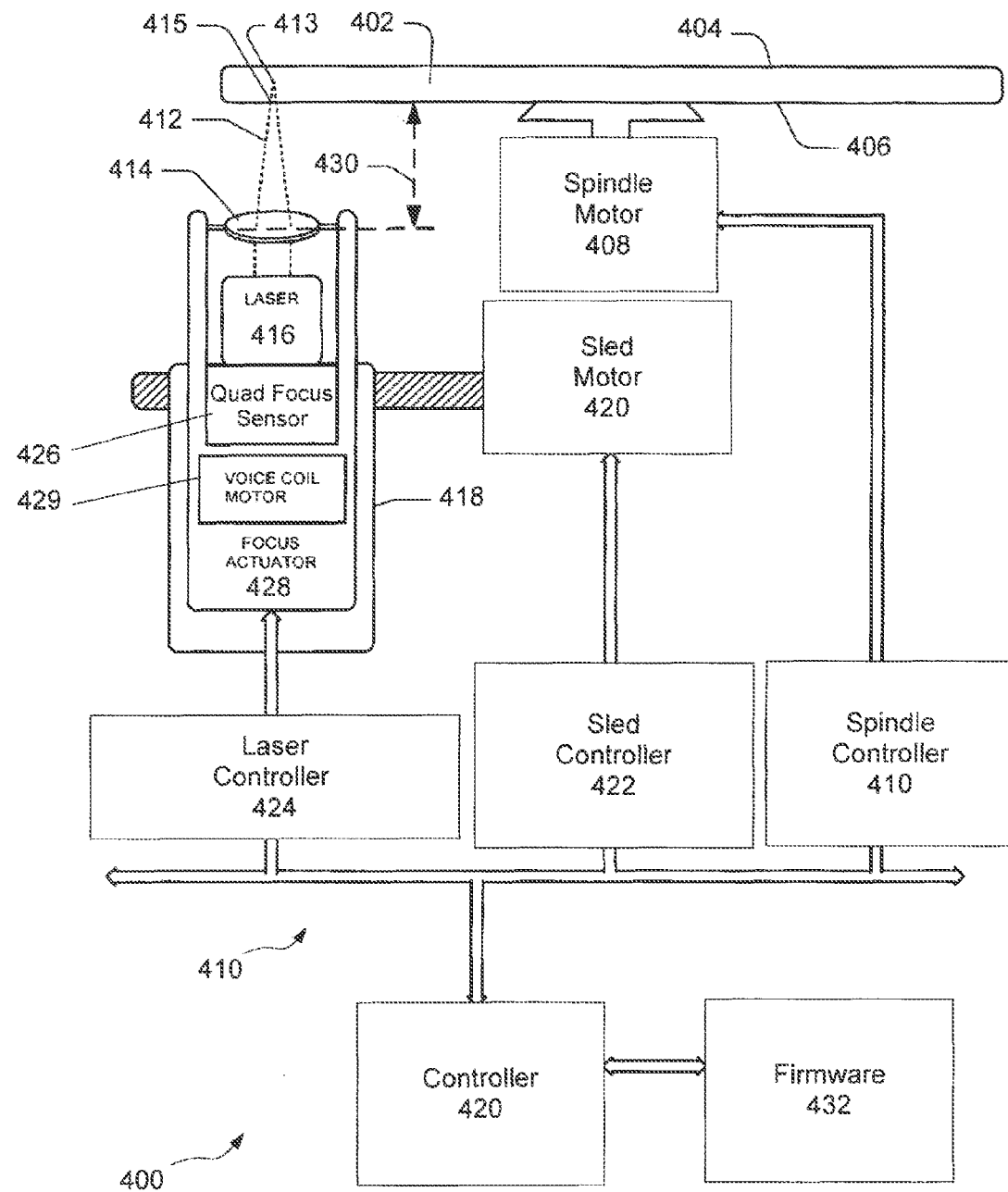
FIG. 4 illustrates one example of an optical storage device according to an embodiment of the present invention.

FIG. 4 illustrates one example of an optical storage device 400 according to an embodiment of the present invention. The drive mechanism 410 operates under the direction of the controller 420. The controller 420 is configured to execute program statements such as those contained in firmware 432. A disk 402 having a data side 404 is shown oriented to position a label side 406 for marking. In other embodiments, the data and the label may be on the same side of the disk 402. The disk 402 is rotated and marked by the drive mechanism 410. More specifically, the disk 402 is rotated by a spindle motor 408, which is controlled by a spindle controller 410. A laser 416 is carried by a sled 418, which is moved in a radial direction by the sled motor 420.

In a typical application, a sled controller 422 directs the sled motor 420 to advance the sled 418, carrying the laser 416, in incremental steps from a radially inner edge of a label region of the label side 406 to a radially outer edge of the label region. The laser 416 generates an optical beam such as laser beam 412. The laser beam 412 passes through optics, such as objective lens 414. The objective lens 414 is shown positioned at an exemplary working distance 430 from the disk 402. At the exemplary working distance 430 illustrated in FIG. 4, the objective lens 414 focuses the laser beam 412 upon a point beneath the surface of the label side 406 of the disk 402, such as focal point 413. As shown in FIG. 4, when the laser beam 412 strikes the coated surface of the label side 406, the laser beam 412 is not in focus, creating an irradiated spot 415 upon the surface of the label side 406 that is generally oval or circular, and desirably larger than the focal point 413.

A laser controller 424 controls the operation of the laser 416 and associated tracking coils and sensors. In the example of FIG. 4, a quad focus sensor 426 typically contains four sensors, and is designed to facilitate focusing of the laser beam 412 at the center of a data track. The focus actuator 428 is configured to adjust the working distance 430 by moving optics such as the objective lens 414, so that the laser beam 412 may be focused on a focal point 413 at a position that may be at, above, or beneath the surface of the disk 402. The focus actuator 428, for example, includes a voice coil motor 429 that is mechanically coupled to the objective lens 414 (such as by pins connected to the objective lens 414 at a rim of the lens 414), for moving the objective lens 414. The working distance 430 may be adjusted by varying a drive signal, which may be a voltage or current applied to the focus actuator 428, such as a voltage applied to the voice coil motor 429.

Figure 5:
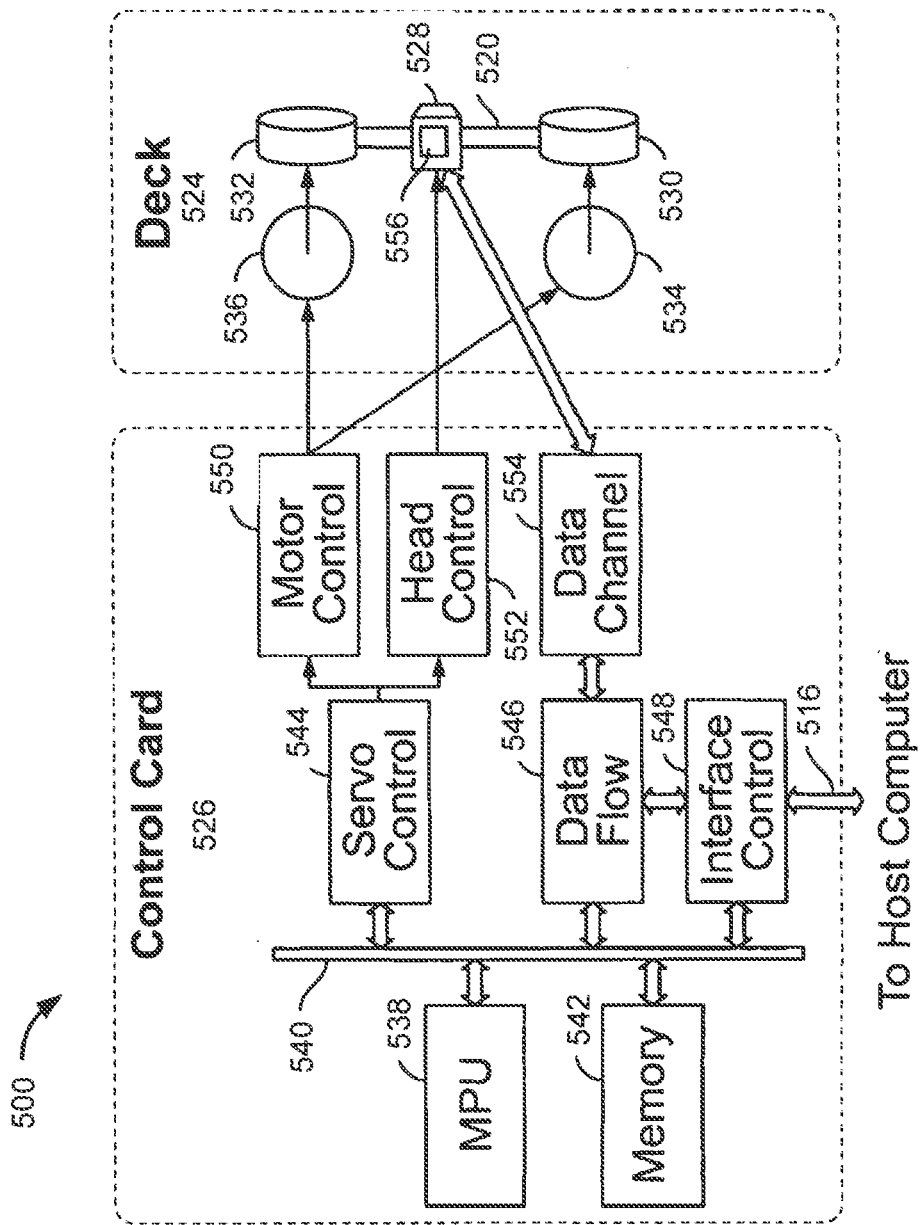
FIG. 5 illustrates one example of a tape drive according to an embodiment of the present invention.

FIG. 5 illustrates one example of a tape drive 500 according to an embodiment of the present invention. The tape drive 500 in FIG. 5 includes a deck 524 including movable parts, and a control card 526 including various circuits and buses. The deck 524 includes a head assembly 528 which contacts the tape 520 of the tape cartridge inserted into the tape drive 500 to read and write data and read a servo pattern, and motors 534 and 536 for respectively rotating a supply reel 530 and a take-up reel 532. For a tape cartridge of a dual reel type, both of the reels 530 and 532 are included in the tape cartridge. For a tape cartridge of a single reel type, however, only the supply reel 530 is included in the tape cartridge while the take-up reel 532 is provided in the tape drive 500. In FIG. 5, the deck 524 additionally includes a tracking mechanism 556 for moving the head assembly 528 across the width of the tape 520 and positioning the head assembly 528 at a desired track on the tape 520.

The control card 526 includes a microprocessor (MPU) 538 for the overall control of the tape drive 500; a memory 542, a servo control unit 544, a data flow unit 546 and an interface control unit 548 all of which are connected to the MPU 538 via an internal bus 540; a motor control unit 550 and a head control unit 552 which are connected to the servo control unit 544; and a data channel unit 554 which is connected to the data flow unit 546. While the memory 542 is shown as a single hardware component in FIG. 5, it is actually preferably constituted by a read only memory (ROM) storing a program to be executed by the MPU 538, and a working random access memory (RAM). The servo control unit 544 manages speed control for the motors 534 and 536 and position control for the head assembly 528 by transmitting the respective control signals to the motor control unit 550 and the head control unit 552. The motor and head control units 550 and 552 respond to these control signals by physically driving the motors 534, 536 and positioning the head assembly 528, respectively.

The head assembly 528 includes servo heads that read data from servo tracks or bands on the tape 520. Control card 526 utilizes data from the servo tracks to generate a position error signal (PES), and the PES is used by the servo control unit 544 to cause the head control unit 552 to position the head assembly 528. In some conventional designs the head assembly 528 includes a voice coil motor (VCM) 556 that receives electrical signals from the head control unit 552 and positions the head assembly 528 according to the received signals.

The data flow unit 546 compresses data to be written on the tape 520, decompresses data read from the tape 520 and corrects errors, and is connected not only to the data channel unit 554 but also to the interface control unit 548. The interface control unit 548 is provided to communicate data to/from the host computer via the cable 516. The data channel unit 554 is essentially a data modulating and demodulating circuit. That is, when data is written to the tape 520, it performs digital-analog conversion and modulation for data received from the data flow unit 546, and when data is read from the tape 520, it performs analog-digital conversion and demodulation for data read by the head assembly 528.

Figure 6:
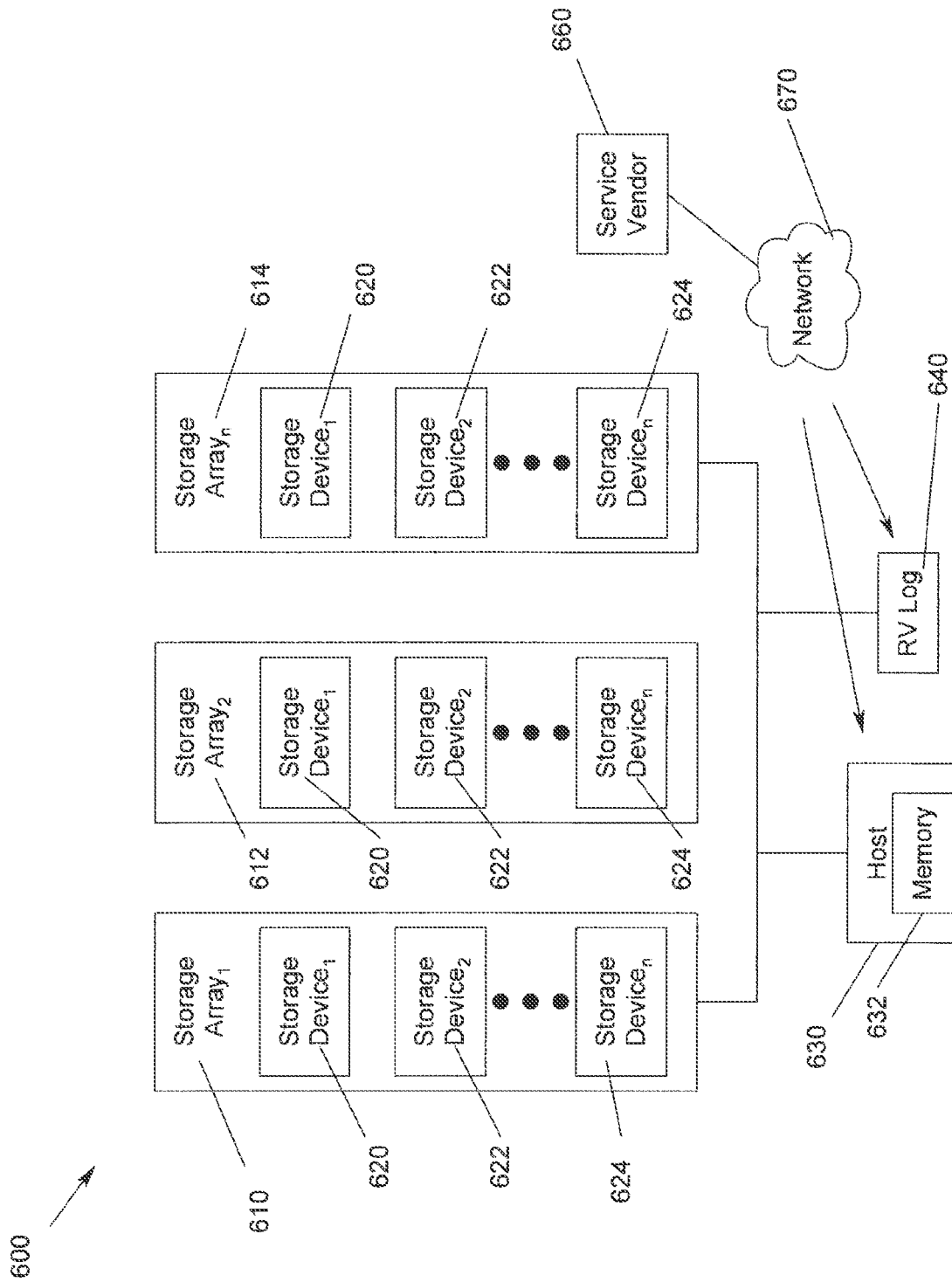
FIG. 6 illustrates a storage system wherein storage devices pass a variable associated with its rotational vibration (RV) for maintenance in a rotational vibration log according to an embodiment of the present invention.

FIG. 6 illustrates a storage system 600 wherein storage devices pass a variable associated with its rotational vibration (RV) for maintenance in a rotational vibration log according to an embodiment of the present invention. In FIG. 6, a plurality of storage arrays 610, 612, 614 is provided. Each of the storage arrays 610, 612, 614 may include a plurality of storage devices, i.e., storage device$_1$ 620, storage device$_2$ 622, . . . , storage device$_n$ 624. The present invention is not meant to be limited to a particular type of storage device. For example, any of storage device$_1$ 620, storage device$_2$ 622, . . . , storage device$_n$ 624 may be a hard disk drive, an optical drive or a tape drive.

The storage arrays 610, 612, 614 are coupled to a host 630. The host provides to the storage arrays 610, 612, 614 data for storage on storage device$_1$ 620, storage device$_2$ 622, . . . , storage device$_n$ 624. In addition, host 630 issues commands to storage device$_1$ 620, storage device$_2$ 622, . . . , storage device$_n$ 624 for retrieving data stored thereon.

Each of the storage devices may be configured to send information regarding any rotational vibration (RV) issue to a location that is readable by the host, e.g., RV log 640. For example, storage device$_1$ 620, storage device$_2$ 622, . . . , storage device$_n$ 624 may store information regarding any corrective action that has been taken to compensate for RV. The host periodically checks if the drive has been significantly degraded by rotational vibration and can surface this information so that a corrective action can take place before data loss occurs.

This RV log 640 provides a significant performance and maintenance advantage because rotational vibration is load dependant, and it is not feasible to test every single possible load in a system. The information regarding rotational vibration (RV) issues of a storage device may be provided automatically to the RV log 640. Alternatively, the host may query the storage devices for changes in rotational vibration (RV) status. Preferably, the code for providing the RV log information runs in real time on a system allowing for "always on" protection. The advantage of this approach is that it reduces the need for expensive hardware while still preventing performance degradation and data loss due to RV.

The information provided to the RV log 640 may also be used to identify problems created by the host cooling system and by external vibration sources such as other devices in the computer room and building vibrations. In addition, it will aid in the development and test of new systems and qualification of new drives into existing system designs by quickly identifying the RV status of each storage device in the system.

Periodically, the host 630 will check the storage devices 620, 622, 624 and RV log 640. Any corrective action that has been taken since the last check will be logged. The host will access the RV log 640 to read the RV variable from each storage device that has been updated. The host tracks each storage array in the system and keep logs for each at the RV log 640.

If the RV variable exceeds the allowable limit for a given time, e.g., the rotational vibration of a drive meets a predetermined criteria, an error can be surfaced and associated with all other system workloads so that a full analysis of the system can be performed. For example, the number of corrective actions may be above the allowable limit for a given time thereby resulting in the surfacing of an error.

Systems on a customer site may be continuously monitored thereby dramatically improving the currently relied upon method of simulating what is believed to be worst-case workloads during product test. Since there are numerous sources of RV that are specific to customer workload, location, and environment, this type of constant monitoring is the best practice method to determine, and ultimately prevent, performance degradations due to RV.

Once an RV problem is surfaced and the workloads analyzed the system management can rearrange the configuration to compensate for the RV disturbance. It can take into account storage device activity and reassign volumes and arrays as to spread the activity of drives limiting rotational vibration interaction. All of this can be performed without disruption or interaction making the storage system 600 "self healing". Furthermore, other system criteria can be used to ascertain root cause of the RV performance impact such as fan speed. If the invented RV variable from the storage devices 620, 622, 624 correlates to the cooling system increasing the system fan speed, steps can be performed automatically to compensate such as slowing some fans down while speeding up others removing the frequency component causing the degradation.

Ultimately if the root cause can not be compensated for in the system 600, the storage system 600 may "call home" to a service vendor 660 to indicate that the RV problem need further analysis, e.g., because the RV is being cause by external means such as other equipment in the same room or the building itself. By calling home and identifying an RV performance problem, service technicians can work with a customer to identify alternative solutions.

In addition to "calling home", the service vendor 660 may periodically access the data via a network 670 to provide an additional service. For example, by allowing the service vendor 660 to periodically access the data, problems may be anticipated and more thorough or new analytics may be applied to the data. Further, the service vendor may provide updates to the customer via the network 670.

Maintaining the RV variable that is updated by the storage device itself, the practice of monitoring this variable periodically, taking steps to automatically rearrange workload and other system variables to eliminate the source of the RV, and ultimately calling home in the event of an external source has many benefits. Some of these benefits are better performing systems, less warranty cost since the system will self heal, better test coverage of various workloads through product test, and a potential to reduce the cost of mechanical design.

Generally, the storage system 600 runs instructions tangibly embodied in a computer-readable medium, e.g. one or more of the host memory 632 and storage devices 620, 622, 624. Moreover, the instructions which, when read and executed by host 630 and storage devices 620, 622, 624, causes the storage system 600 to perform the steps necessary to implement and/or use the present invention.

Figure 7:
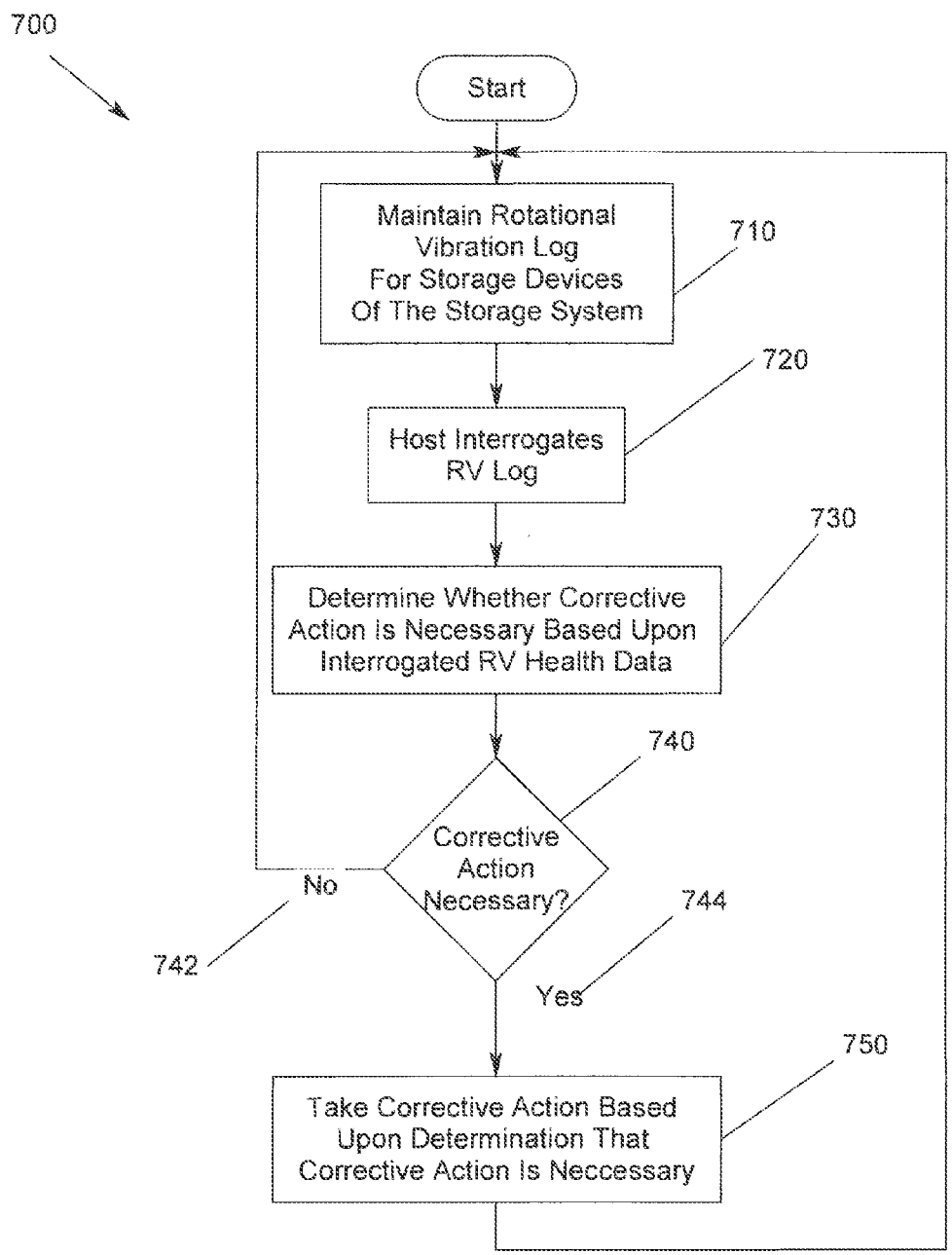
FIG. 7 is a flow chart of a method for providing a periodic rotational vibration check for storage devices to compensate for varying loads according to an embodiment of the present invention.

FIG. 7 is a flow chart 700 of a method for providing a periodic rotational vibration check for storage devices to compensate for varying loads according to an embodiment of the present invention. In FIG. 7, a rotational vibration (RV) log is maintained for storage devices of a storage system 710. The host interrogates the RV log 720. This may be done periodically or upon identification of a read/write failure. The host determines whether corrective action is necessary based upon the interrogated RV data 730. A determination is made whether corrective action is necessary 740. If no 742, the process returns to maintain the RV log 710. If yes 744, corrective action is taken based upon the determination that corrective action is necessary 750.

Figure 8:
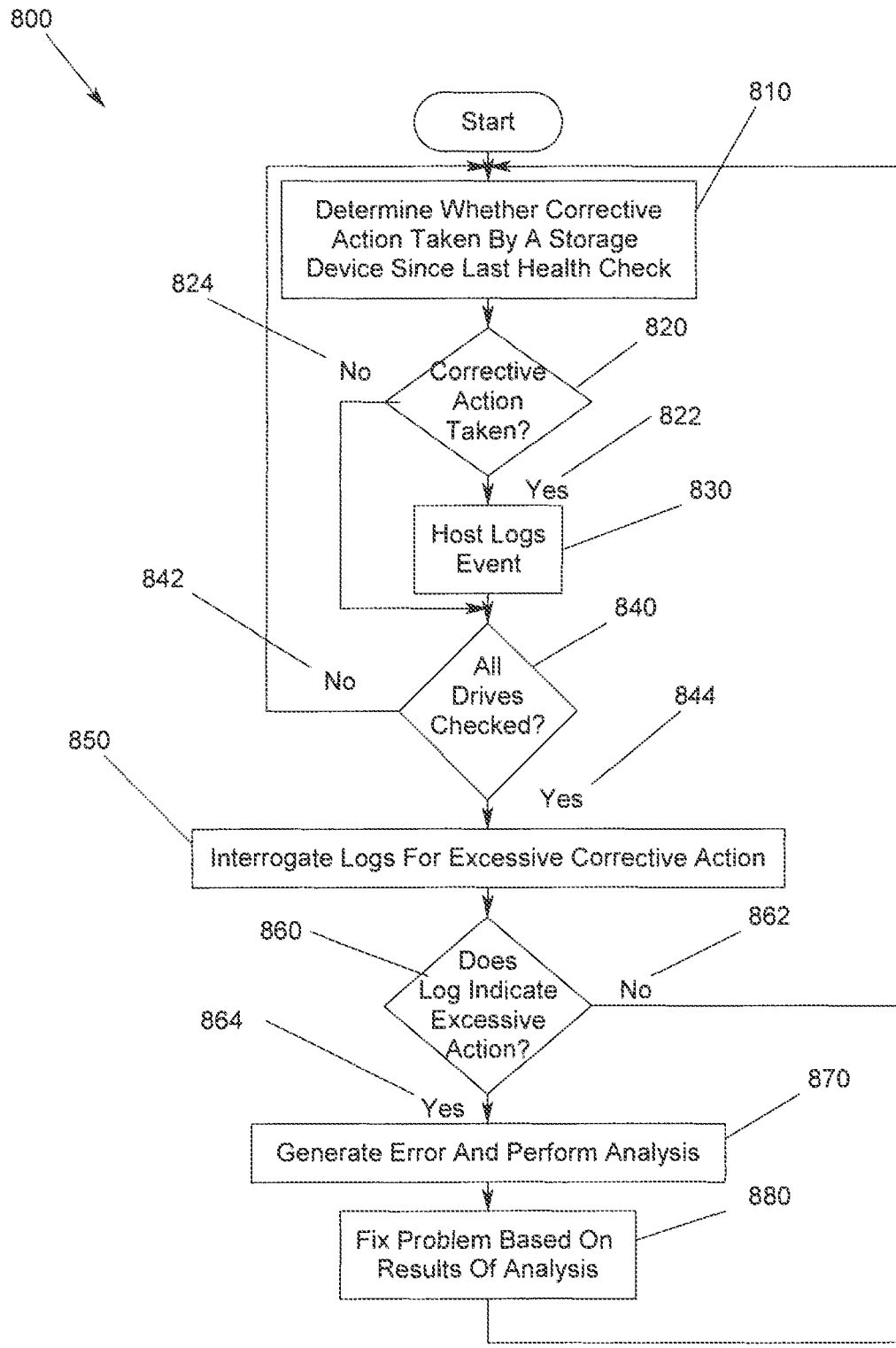
FIG. 8 is a flow chart showing greater detail of a method for maintaining RV logs for providing a rotational vibration check for storage devices to compensate for varying loads according to an embodiment of the present invention.

FIG. 8 is a flow chart 800 showing greater detail of a method for maintaining RV logs for providing a rotational vibration check for storage devices to compensate for varying loads according to an embodiment of the present invention. In FIG. 8, the host analyzes data to determine whether corrective action has been taken by a storage device since the last heath check 810. A determination is made 820. If yes 822, the host logs the event 830. If not 824, the process continues. A determination is then made whether all drives have been checked 840. If not 842, the process returns to analyze data to determine whether corrective action has been taken by a storage device since the last heath check 810. If yes 844, the logs are interrogated for excessive corrective action 850. A determination is made whether the log indicates excessive corrective action has taken place 860. If not 862, the process returns to analyze data to determine whether corrective action has been taken by a storage device since the last heath check 810. If yes 864, an error is generated and analysis is performed on the RV data 870. Based upon the analysis, the problem is compensated for 880.

Figure 9:
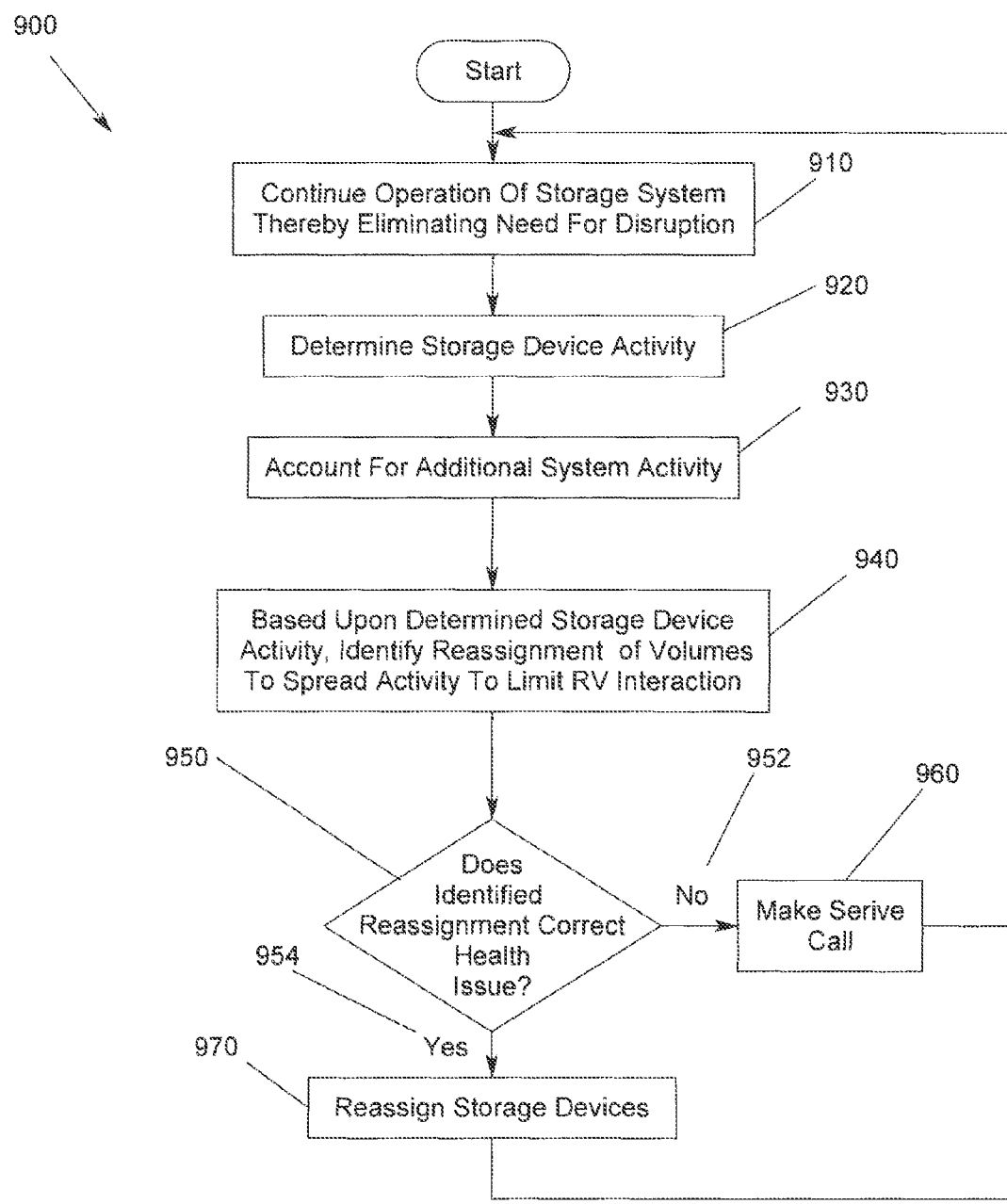
FIG. 9 is a flow chart of a method for analyzing the RV log to identify corrective action to be taken to compensate for RV issues according to an embodiment of the present invention.

FIG. 9 is a flow chart 900 of a method for analyzing the RV log to identify corrective action to be taken to compensate for RV issues according to an embodiment of the present invention. In FIG. 9, the analysis begins without disrupting the normal operation of the storage system 910. The storage device activity is determined 920. Any additional system activity that may be affecting the RV status of a storage device is accounted for 930. Based upon the determined storage device activity, reassignment of volumes to spread the activity to limit RV interaction is determined 940. A determination is made whether the identified reassignment corrects the RV issue 950. If not 952, a service request is issues to the service vendor 960. If yes 954, the volumes are reassigned to compensate for RV interaction 970.

Figure 10:
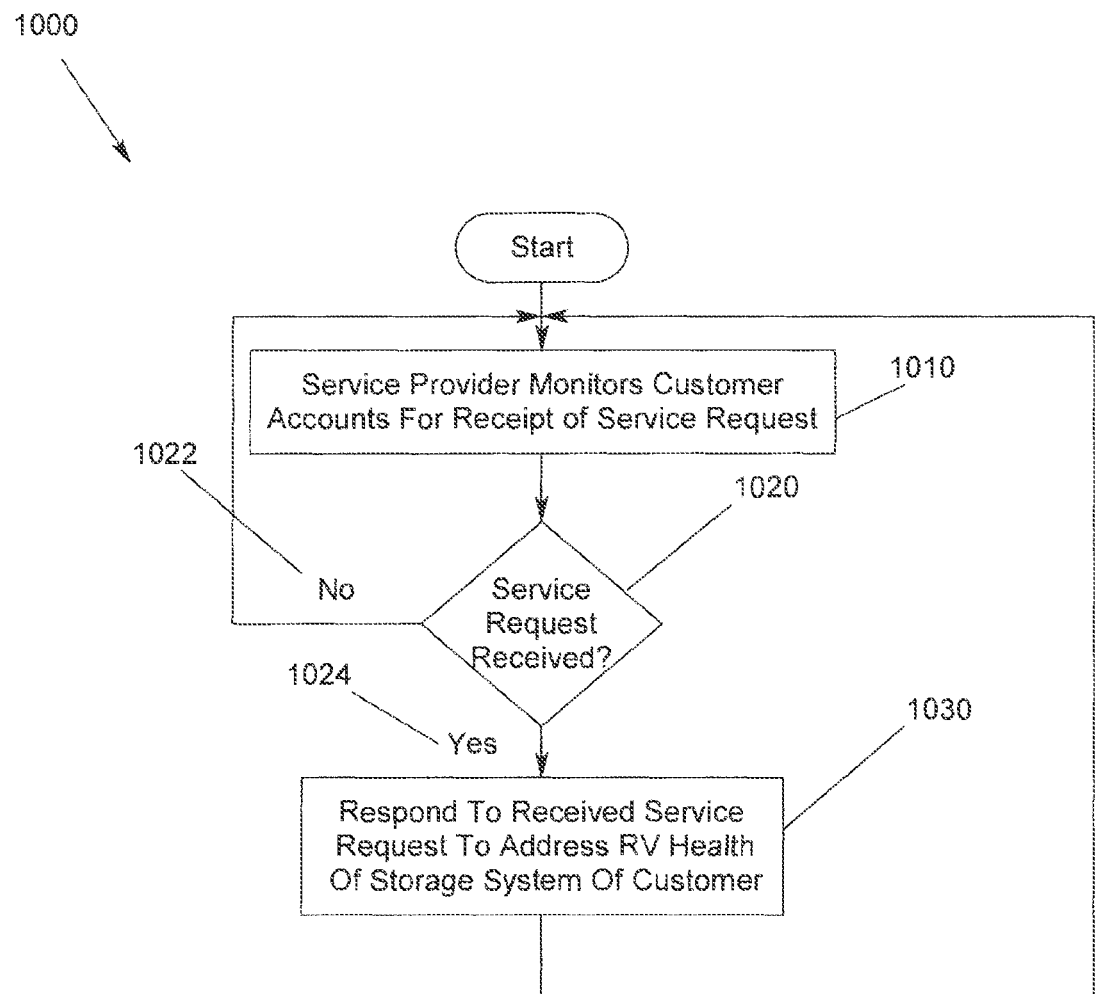
FIG. 10 is a flow chart of the service provider maintenance process according to an embodiment of the present invention.

FIG. 10 is a flow chart 1000 of the service provider maintenance process according to an embodiment of the present invention. In FIG. 10, the service provider monitors customer accounts for receipt of a service request 1010. A determination is made whether a service request has been received 1020. If not 1022, the process returns to monitor the customer accounts for receipt of a service request 1010. If yes 1024, the service provider responds to the received service request to address the RV issue of the storage system of the customer 1030.

Figure 11:
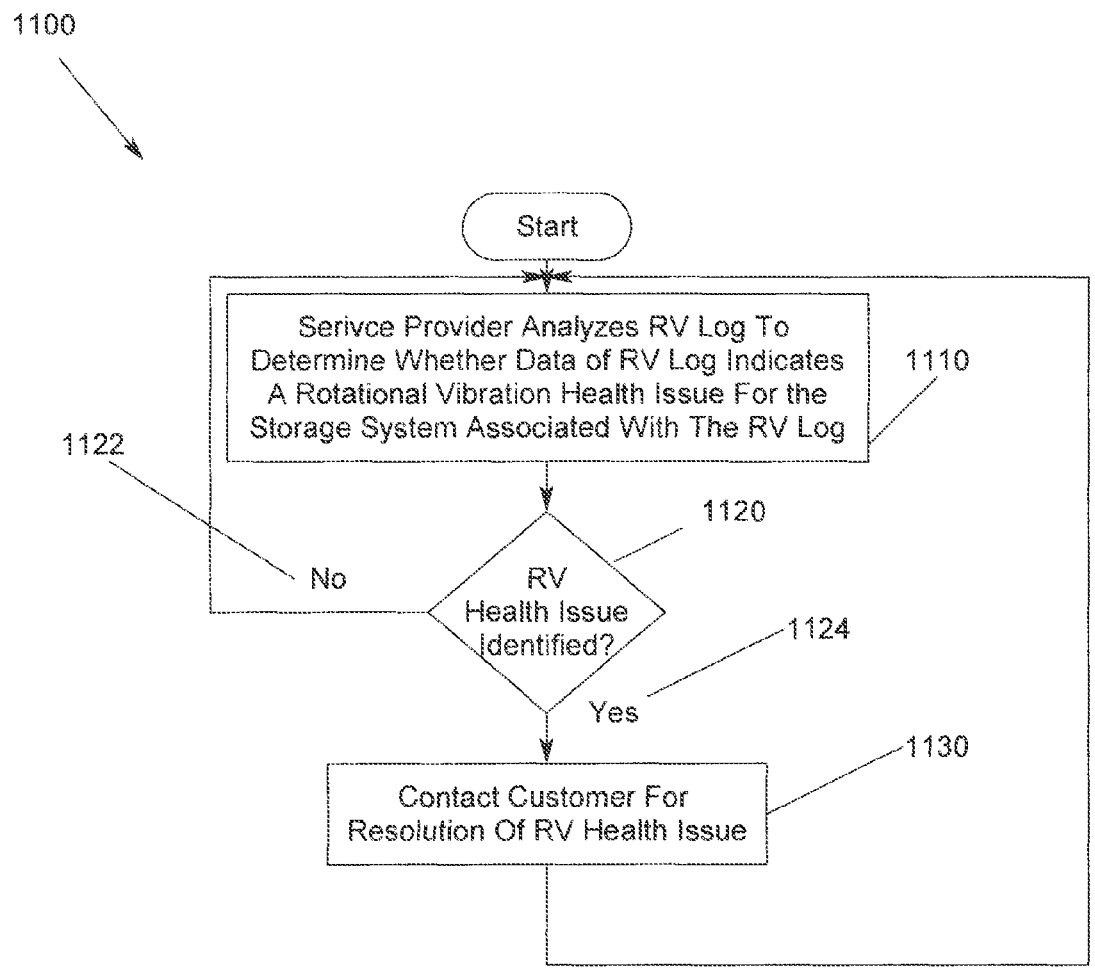
FIG. 11 is a flow chart of the process performed by a service provider to identify RV issues.

FIG. 11 is a flow chart 1100 of the process performed by a service provider to identify RV issues. As indicated above with reference to FIG. 6, a service may be provided the RV log data or may remotely access the RV log data. As shown in FIG. 11, the service provider analyzes the RV log to determine whether data of the RV log indicates a rotational vibration issue for the storage system associated with the RV log 1110. A determination is made whether an RV issue is identified for the storage system 1120. If not 1122, the process returns to analyze the RV log 1110. If yes 1124, the service provider contacts the customer to resolve the RV issue 1130. In this manner, the service provider may also anticipate RV issues.

The foregoing description of the embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A program product comprising a non-transitory computer readable storage medium embodying at least one program of instructions executable by a computer to perform operations to monitor rotational vibrations, comprising:
   monitoring rotational vibration in a storage system;
   analyzing system workloads; and
   reducing the rotational vibration in response to the analysis of the system workloads by reconfiguring the storage system.

2. The program product of claim 1, wherein the monitoring rotational vibration in a storage system further comprises maintaining a rotational vibration log, the rotational vibration log including information regarding a rotational vibration status of at least one storage device.

3. The program product of claim 2, wherein the maintaining a rotational vibration log further comprises providing information regarding a rotational vibration status of at least one storage device to the rotational vibration log when the at least one storage device compensates for rotational vibration.

4. The program product of claim 2, wherein the maintaining a rotational vibration log further comprises storing a variable passed from the at least one storage device representing rotational vibration associated with the at least one storage device.

5. The program product of claim 2, wherein the maintaining a rotational vibration log further comprises storing information regarding any corrective action that has been taken to compensate for rotational vibration.

6. The program product of claim 2, wherein the maintaining a rotational vibration log further comprises storing information associated with problems created by vibration sources external to at least one storage device.

7. The program product of claim 6, wherein storing information associated with problems created by vibration sources external to the at least one storage device further comprises storing information regarding at least one selected from the group consisting of host cooling system, devices external to the at least one storage device and building vibrations.

8. The program product of claim 2 further comprises granting a service vendor rights to access the rotational vibration log to resolve rotational vibration problems associated with at least one storage device.

9. A system, comprising:
   a processor; and
   memory, coupled to the processor, the memory comprising a computer usable medium embodying at least one program of instructions to perform operations, the operations comprising:
   monitoring rotational vibration of at least one storage device in a storage system;
   analyzing system workloads; and
   reducing the rotational vibration in response to analyzing of the system workloads by reconfiguring the storage system.

10. The system of claim 9, wherein the reconfiguring comprises reassigning workloads within an array of storage devices.

11. The system of claim 9, wherein the reconfiguring comprises reassigning volumes and arrays to spread activity of the at least one storage device to reduce rotational vibration interaction.

12. The system of claim 9, wherein the monitoring further comprises maintaining a rotational vibration log for the storage system.

13. The system of claim 12, wherein the maintaining a rotational vibration log for the storage system further comprises maintaining rotational vibration data associated with at least one storage device.

14. The system of claim 12, wherein the maintaining a rotational vibration log for the storage system further comprises storing a variable received from at least one storage device representing rotational vibration associated with the at least one storage device.

15. The system of claim 12, wherein the maintaining a rotational vibration log for the storage system further comprises storing information regarding any corrective action that has been taken to compensate for rotational vibration.

16. The system of claim 12, wherein the maintaining a rotational vibration log for the storage system further comprises checking the rotational vibration log to determine whether a storage device has been significantly degraded by rotational vibration and surfacing an error to initiate corrective action before data loss occurs when a drive has been significantly degraded by rotational vibration.

17. The system of claim 12, wherein the maintaining a rotational vibration log for the storage system further comprises storing information associated with problems created by external vibration sources.

18. The system of claim 17, wherein the storing information associated with problems created by external vibration sources further comprises storing information associated with at least one selected from the group consisting of host cooling system, devices external to the at least one storage device and building vibrations.

19. The system of claim 9, wherein the monitoring rotational vibration of at least one storage device in a storage system further comprises maintaining a rotational vibration log for the storage system, determining whether information in the rotational vibration log meets a predetermined criteria and surfacing an error in response thereto.

20. The system of claim 9, wherein the monitoring rotational vibration of at least one storage device in a storage system further comprises rearranging a configuration of the workloads of the storage system to compensate for the rotational vibration when the information in the rotational vibration log meets a predetermined criteria.

21. The system of claim 9, wherein reconfiguring the storage system based upon the analysis of the system workloads to reduce the rotational vibration further comprises reassigning volumes and arrays to spread activity of the at least one storage device to reduce rotational vibration interaction.

22. The system of claim 9, wherein reconfiguring the storage system based upon the analysis of the system workloads to reduce the rotational vibration further comprises performing rotational vibration log analysis to identify rotational vibration caused by fan speed and changing fan speed to remove a frequency component causing the rotational vibration.

23. The system of claim 9 further comprising issuing a service request to a service vendor to indicate that a rotational vibration problem needs further analysis when reconfiguring the storage system fails to reduce rotational vibration.

* * * * *